Feb. 26, 1974     H. J. J. MEGENS     3,794,474

METHOD OF MANUFACTURING A PROFILED GRINDING WHEEL

Filed Aug. 30, 1971

*INVENTOR.*
HENDRIKUS J.J. MEGENS

BY

Agent

United States Patent Office 3,794,474
Patented Feb. 26, 1974

3,794,474
METHOD OF MANUFACTURING A PROFILED GRINDING WHEEL
Hendrikus Johannes Josephus Megens, Emmasingel, Eindhoven, Netherlands, assignor to U.S. Philips Corporation, New York, N.Y.
Filed Aug. 30, 1971, Ser. No. 176,127
Claims priority, application Netherlands, Sept. 5, 1970, 7013165
Int. Cl. B24b 5/26
U.S. Cl. 51—295  3 Claims

ABSTRACT OF THE DISCLOSURE

A method of manufacturing a profiled grinding wheel in which a grinding band is provided on the profiled circumference of a supporting disc, the band being built up from a synthetic binder and diamond grains. Starting material is a ceramic grinding wheel which, after profiling, is used for grinding a counter profile in a mould. By reducing the diameter of the supporting disc, a gap is formed between the circumference of said disc and the counter profile in the mould, the height of said gap being equal to the thickness of the grinding band to be provided. A mixture of synthetic binder and diamond grains is provided on the circumference of the supporting disc. By rotating the supporting disc in the counter profile, said mixture is distributed across the gap and a grinding band of constant thickness is formed. All operations are carried out with the same fixture of the supporting disc and the mould.

---

Figure 1:
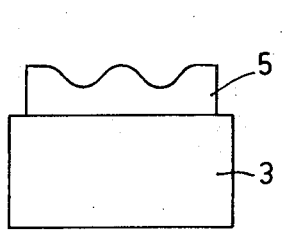

The invention relates to a method of manufacturing a profiled grinding wheel in which the circumference of a supporting disc is dressed according to a desired profile and a grinding band is then provided on the profiled circumference of the supporting disc, said grinding band being built up from a synthetic binder and diamond grains.

Grinding wheels using a grinding band comprising diamond grains are preferably used in working hard metals and ceramic materials.

In a known method the grinding band is formed by the cooperation of a metal supporting disc and a metal master roller the circumference of which is provided with a counter profile. Since the supporting disc consists of metal, a further profiled ceramic grinding wheel is necessary for profiling the master roller.

It is the object of the invention to provide a method of manufacturing a profiled grinding wheel in which only one single profiled disc is necessary and by which the manufacture of such a wheel is possible in a simple and cheap manner.

According to the invention this object is mainly achieved in that a ceramic grinding wheel is used as a profiled supporting disc by means of which a counter profile is ground in a steel mould, the diameter of the supporting disc being then reduced so that the profile line is displaced in the direction of the center line of the supporting disc and a gap is formed in the mould between the circumference of the supporting disc and the counter profile, the height of said gap corresponding to the thickness of the grinding band to be provided, the pores on the circumference of the profiled supporting disc being then filled by coating with a synthetic resin, a mixture of a cold-setting synthetic binder and diamond grains being then coated on the profiled circumference of the supporting disc, the grinding band being ultimately formed by causing the supporting disc to rotate in the counter profile of the mould until the synthetic resin has hardened sufficiently so that sagging of the grinding band is prevented.

As compared with the known method, the method according to the invention has the advantage that the starting material is a cheap ceramic grinding wheel which can be profiled in a simple manner and in which a good adherence of the grinding band on the grinding wheel is obtained. Since the counter profile is provided in the mould by means of the profiled ceramic disc itself, all operations taking place with the same fixture of the supporting disc and the mould, it is possible to obtain a grinding band the profile of which corresponds very accurately with the desired profile and the thickness of which is constant across the width of the profile.

According to a preferred embodiment of the method according to the invention a grinding wheel which mainly consists of aluminium oxide is used as a supporting disc. Such a grinding wheel which is comparatively soft is extremely suitable for providing profiles with a variety of shapes.

According to another preferred embodiment of the method according to the invention a grinding wheel which mainly consists of silicon carbide is used as a supporting disc. Since such a grinding wheel has a greater hardness than the above-mentioned grinding wheel, the grinding wheel consisting of silicon carbide is more difficult to profile. With this grinding wheel also, however, a good adhesion of the grinding band is obtained.

According to a further preferred embodiment of the method according to the invention a mixture of cold-setting epoxy resin and hardener is used as a synthetic binder. Experiments have proved that, for example, a mixture of epoxy resin and hardener in a mixing ratio of 11:1 sets very rapidly and experiences no variation in shape.

According to another preferred embodiment of the method according to the invention the mould is cylindrical. The use of a rectangular or a cylindrical mould depends upon the grinding machine on which the method is carried out. When a surface grinding machine is used, a rectangular mould is used, whereas in the case of a circular grinding machine a cylindrical mould is used.

A particular characteristic feature of grinding wheels manufactured by means of the method according to the invention is the ceramic supporting disc.

Figure 2:
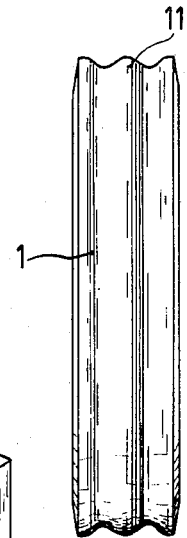
Figure 3:
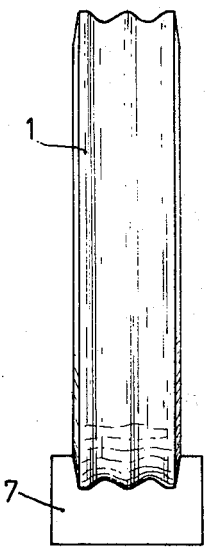
Figure 4:
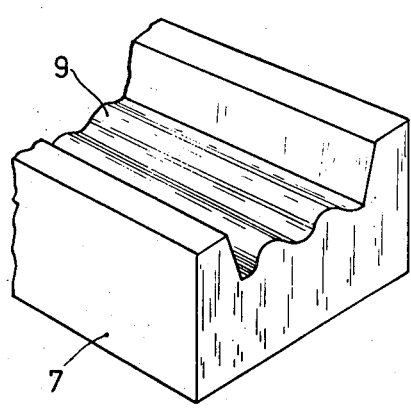
Figure 6:
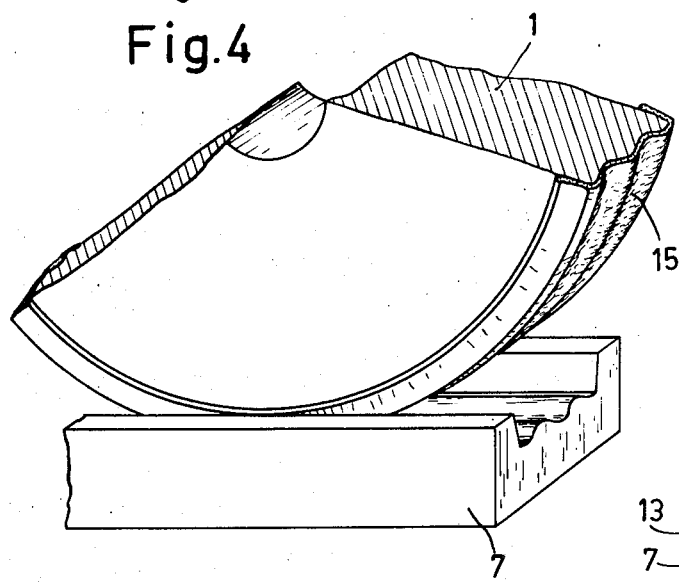
Figure 5:
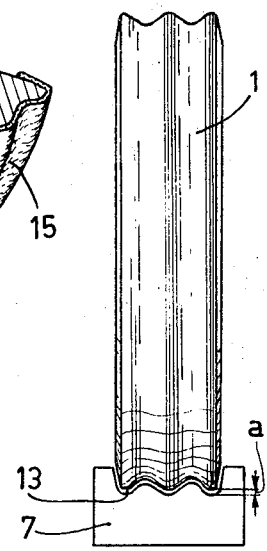

In order that the invention may be readily carried into effect, an embodiment of the method according to the invention will now be described in greater detail, by way of example, with reference to the accompanying drawing, in which:

FIG. 1 shows a template having a profile which is to be transferred to a supporting disc,
FIG. 2 shows the profiled supporting disc,
FIG. 3 shows the supporting disc during grinding of a counter profile in a mould,
FIG. 4 shows the profiled mould,
FIG. 5 shows the supporting disc with the mould after reducing the diameter of the supporting disc,
FIG. 6 shows the supporting disc and the mould during the formation of the grinding band.

For manufacturing a profiled disc, a ceramic grinding wheel which is used as supporting disc 1 and which mainly consists of aluminium oxide or silicon carbide, is mounted on the spindle of a grinding machine which comprises a copying device and is balanced dynamically. The circumference of the supporting disc is profiled, for example, by sensing by means of a sensing needle of a template 3 having the desired profile 5. By means of the supporting disc 1 profiled in this manner, a counter profile 9 is ground in a steel mould 7. The diameter of the supporting disc 1 is then reduced so that the profile line 11 is displaced in the direction of the center line of the supporting disc and a gap 13 is formed between the circumference of the supporting disc 1 and the counter profile 9 of the mould 7, the height $a$ of said gap corresponding to the thickness of the grinding band to be provided. The thickness of the grinding band also depends upon the size of the diamond grains used. The displacement of the profile line 11 can be obtained in a simple manner for example, by using a thinner sensor pin for sensing the template 3 or by displacing the template 3 relative to the copying device.

In order to fill the pores on the circumference of the supporting disc, said disc is coated with a synthetic resin which preferably consists of a mixture of cold-setting epoxy resin and hardener. After having applied this mixture in a thin layer, the supporting disc 1 is coated with a mixture of a synthetic binder and diamond grains. For example, a mixture of cold-setting epoxy resin and hardener is used as a synthetic binder in a mixing ratio of 11:1.

The supporting disc 1 is then driven, the coated mixture being distributed over the gap 13 by the rotation of the supporting disc in the counter profile 9 and a grinding band 15 is formed the thickness of which is equal to the height $a$ of the gap. The quantity of mixture to be provided is equal to the product of the surface of the profile and the height $a$ of the gap 13. The number of revolutions of the supporting disc 1 may not be too high. In order to prevent the sagging of the grinding band 15, the supporting disc 1 is driven until the mixture has hardened sufficiently and sagging of the grinding band 15 does not take place when the supporting disc 1 is stationary. After complete hardening of the mixture, the resulting profiled grinding wheel may be used for grinding steel, hard metal and ceramic materials.

The profiled grinding wheel obtained according to the invention has a striking appearance since the supporting disc consists of a ceramic material.

In the embodiment described, the operations were carried out on a surface grinding machine in which a rectangular mould is used. If the operations are carried out on a circular grinding machine, a cylindrical mould is used. The embodiment in which a rectangular mould is used, however, is simpler and cheaper.

What is claimed is:

1. A method of manufacturing a profiled grinding wheel having a supporting disc and a grinding band formed of a mixture of synthetic binder and diamond grains carried on the profiled circumference of said supporting disc comprising the steps of profiling a ceramic grinding wheel forming a profiled supporting disc, grinding a counter profile in a steel mould by means of said profiled supporting disc, reducing the outside diameter of said supporting disc so that the profile line formed by the circumferential surface of said supporting disc is displaced toward the center of said disc thus forming a gap in the mould between the circumferential surface of said supporting disc and said counter profile, the height of said gap determining the thickness of said grinding band to be provided on the circumference of said supporting disc, coating the circumference of said supporting disc with a synthetic resin so as to fill the pores thereof, applying a mixture of cold-setting epoxy resin and hardener with diamond grains to the circumference of said supporting disc, and rotating the coated supporting disc within the counter profile of said mould until the synthetic binder has sufficiently hardened so as to prevent sagging of the mixture applied thereto thus forming the grinding band.

2. The method according to claim 1 wherein said supporting disc is formed of a grinding wheel consisting essentially of aluminium oxide.

3. The method according to claim 1 wherein said supporting disc is formed of a grinding wheel consisting essentially of silicon carbide.

References Cited

UNITED STATES PATENTS

| | | | |
|---|---|---|---|
| 3,288,580 | 11/1966 | Curn | 51—309 |
| 3,664,819 | 5/1972 | Sioui et al. | 51—298 |
| 3,573,013 | 3/1971 | Curn et al. | 51—293 |
| 3,471,276 | 10/1969 | Bragaw | 51—293 |
| 2,913,858 | 11/1959 | Praeg et al. | 51—298 |
| 3,415,635 | 12/1968 | Hallewell | 51—298 |

DONALD J. ARNOLD, Primary Examiner

U.S. Cl. X.R.

51—298, 307